INVENTOR.

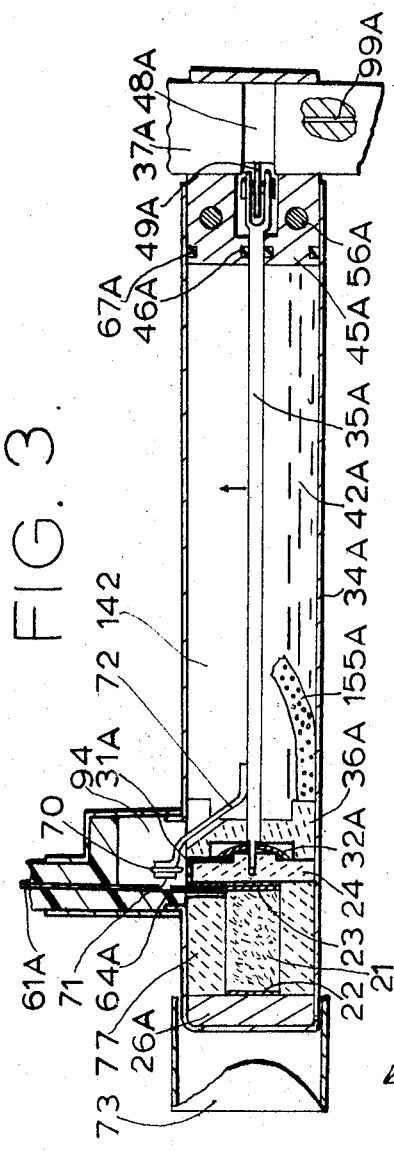
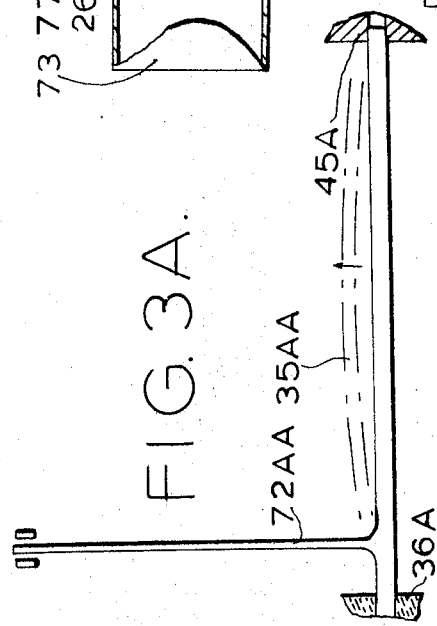
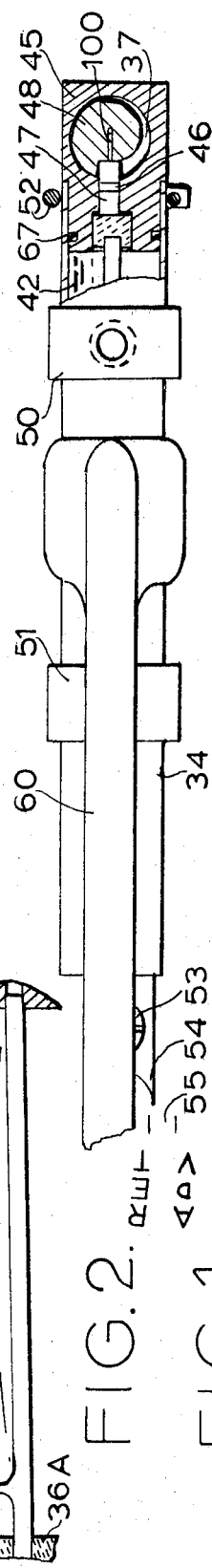
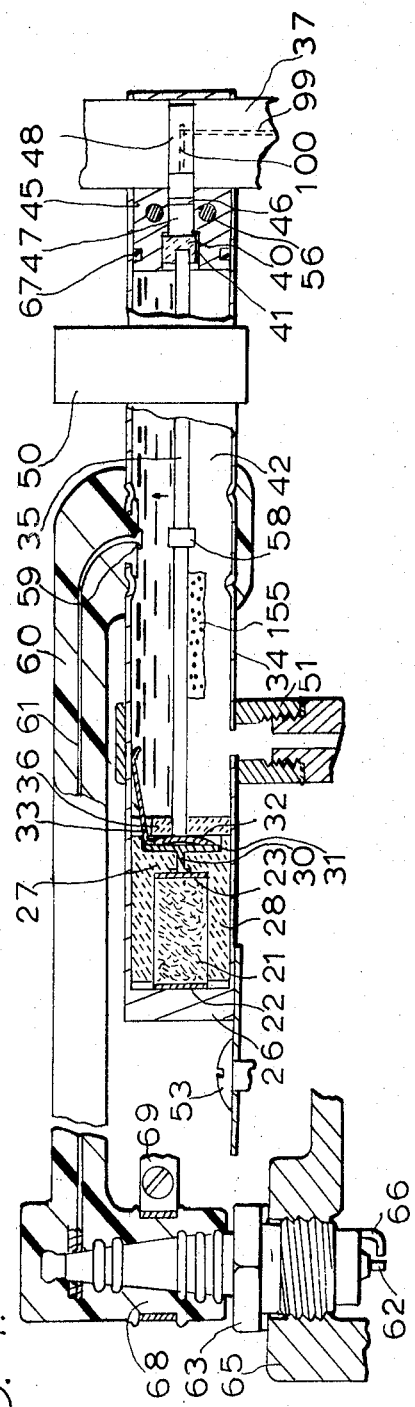

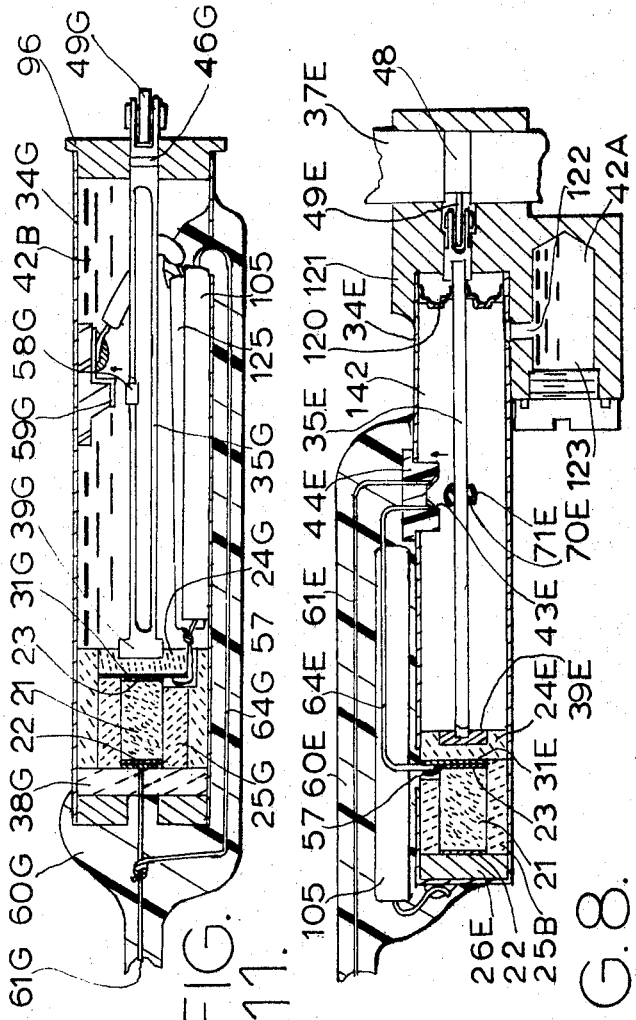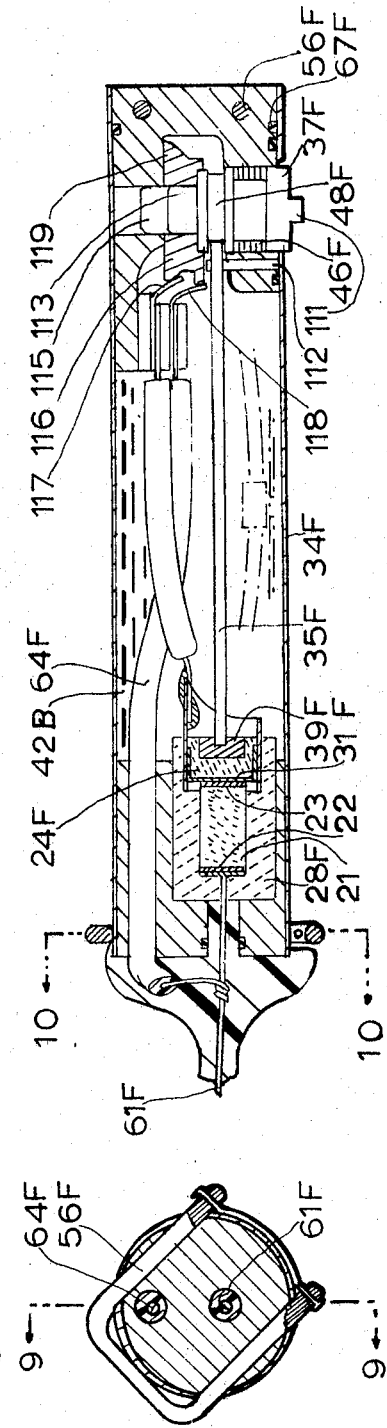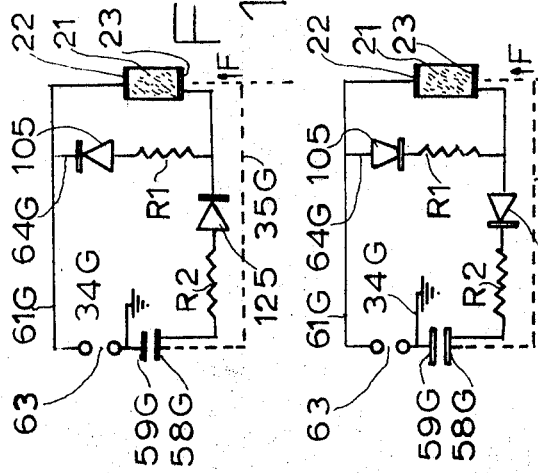

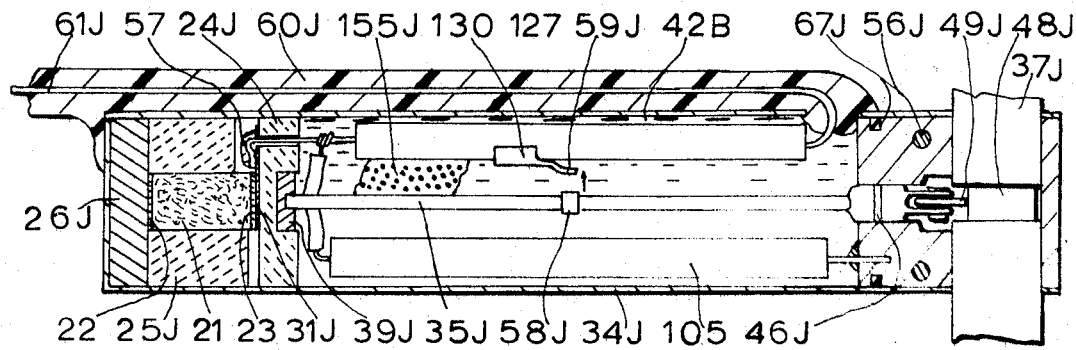
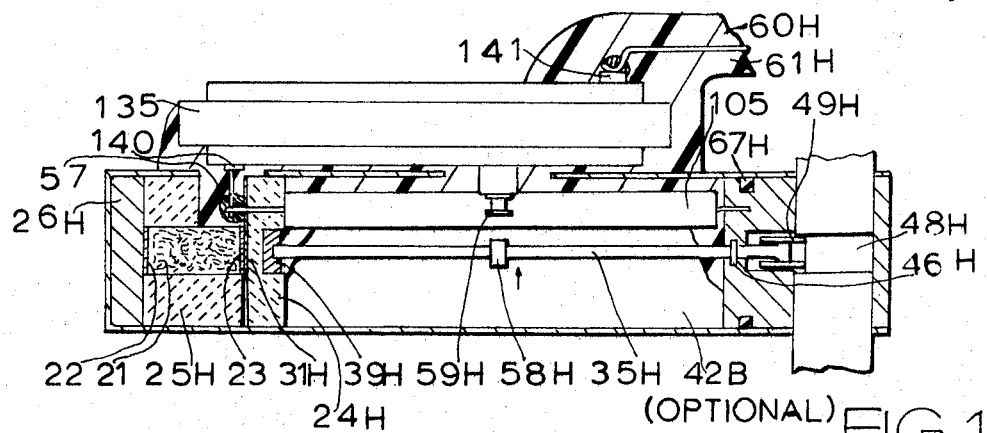
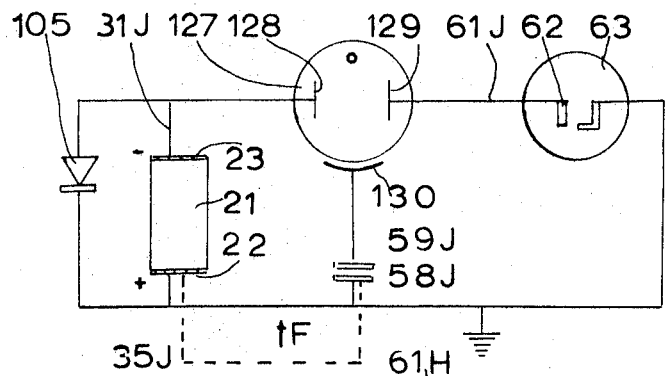
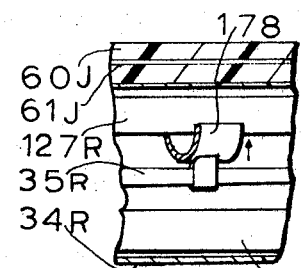
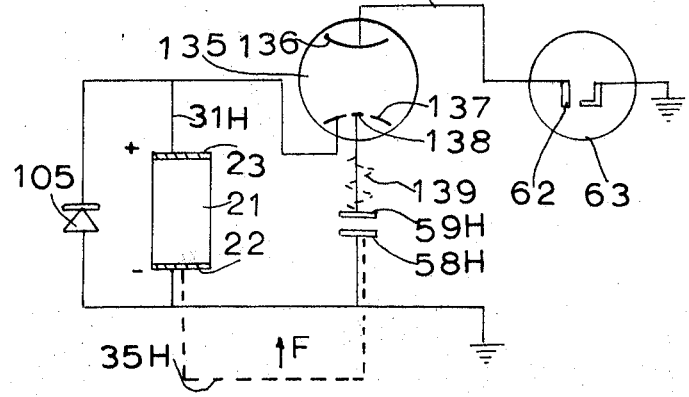

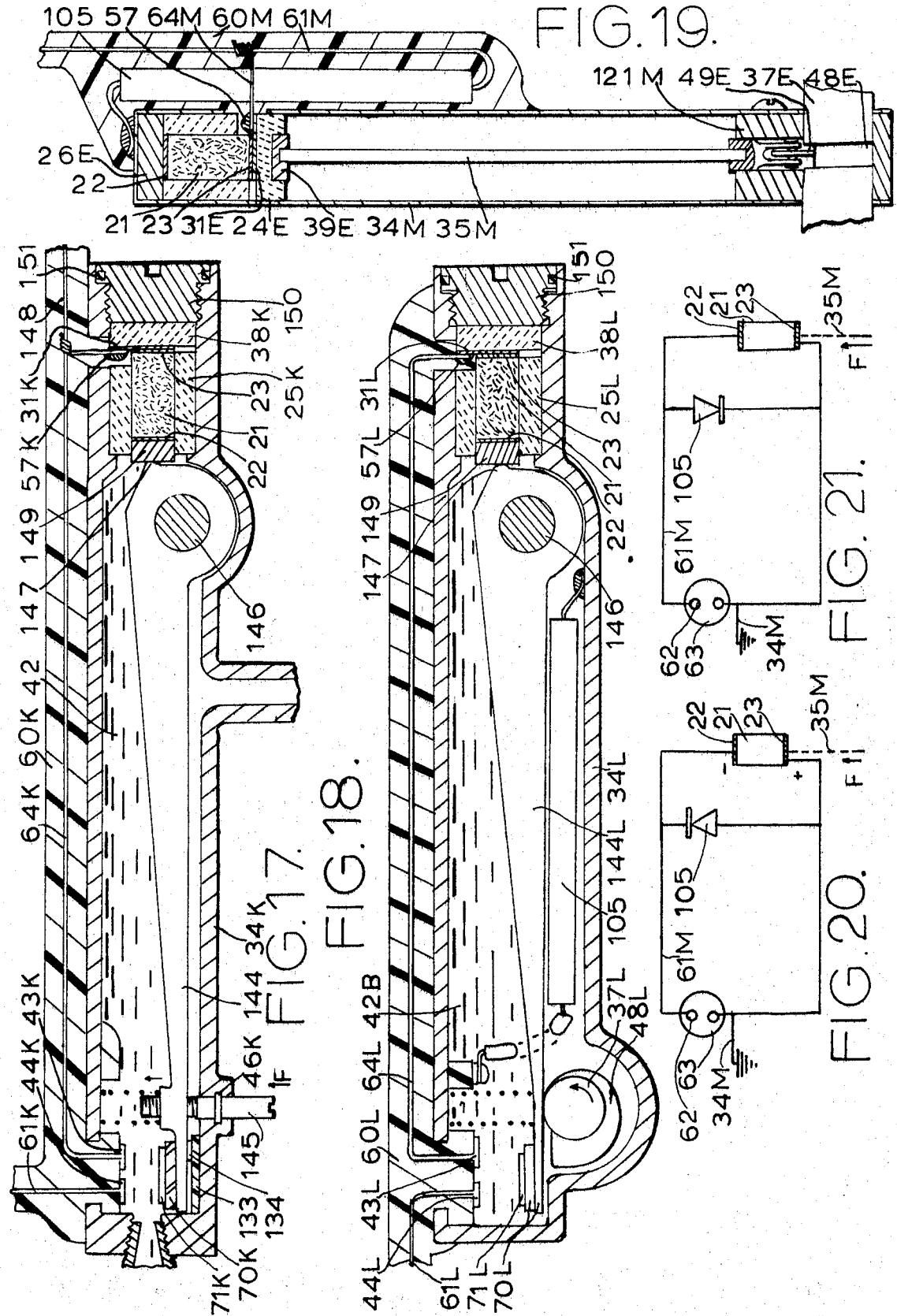

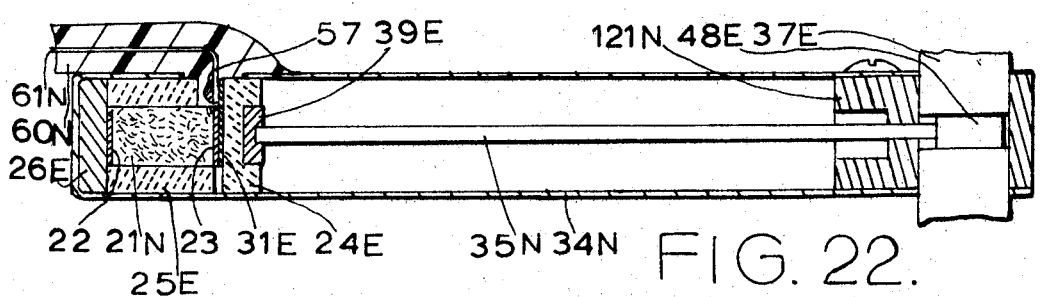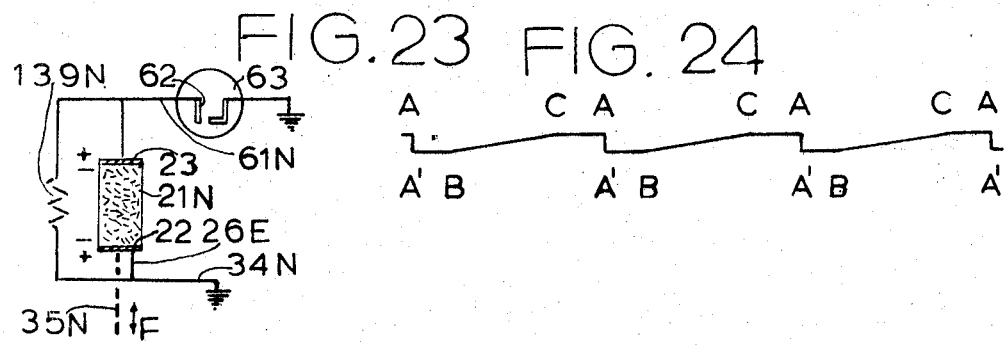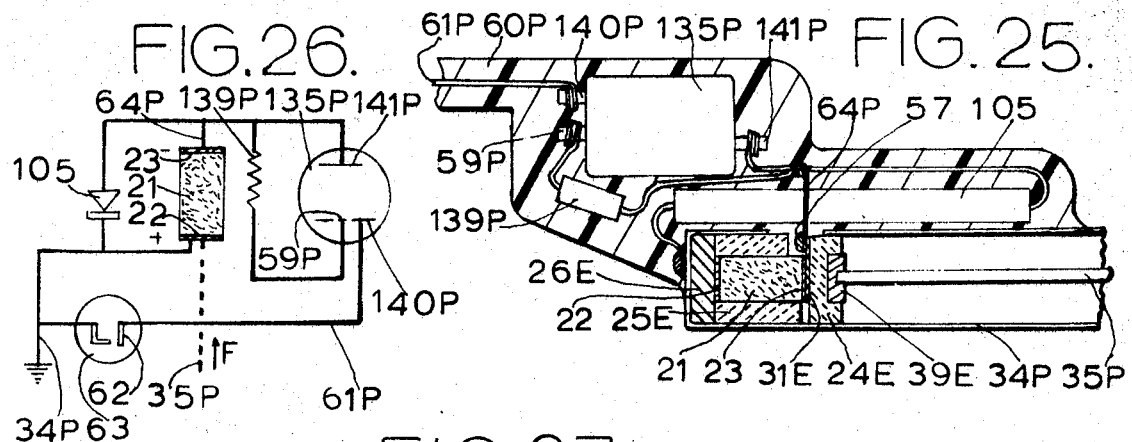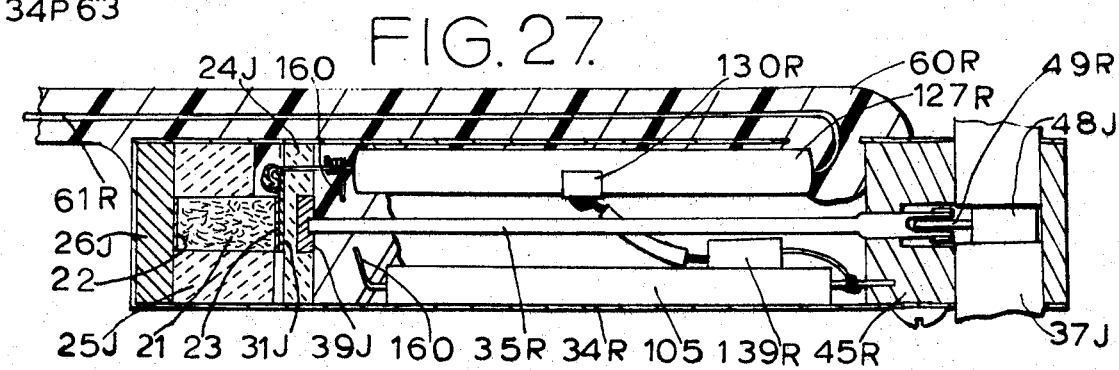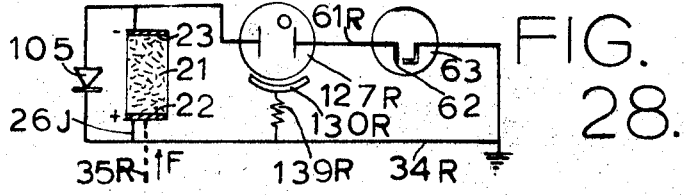

BY

United States Patent Office 3,524,084
Patented Aug. 11, 1970

3,524,084
VOLTAGE GENERATION AND IGNITION TIMING SYSTEMS
John J. Horan, 420 Quigley Ave.,
Willow Grove, Pa. 19090
Continuation-in-part of applications Ser. No. 498,549,
Oct. 20, 1965, and Ser. No. 659,095, Aug. 8, 1967.
This application Dec. 17, 1968, Ser. No. 784,457
Int. Cl. H01v 7/00
U.S. Cl. 310—8.1                          33 Claims

ABSTRACT OF THE DISCLOSURE

This invention includes advanced means for generation, via piezoelectrics, of high-voltage impulses and of timing their discharge, the means being oriented toward engine ignition systems in unitary detachable assemblies.

RELATED APPLICATIONS

This application is a continuation in part of applications 498,549 (filed Oct. 20, 1965) and 659,095 (filed Aug. 8, 1967), now Pat. Nos. 3,430,080 (patented Feb. 25, 1969 and 3,444,850 (patented May 20, 1969) respectively.

BACKGROUND OF THE INVENTION

For many years, the ignition systems for small engines have been chiefly of the magneto type. Most of them consist of a group of assemblies. Their physical construction and their many electrical and mechanical parts, as well as the need for wiring interconnections in the several assemblies, make them vulnerable to failure, especially in the presence of dust and moisture. Malfuncitons are particularly difficult for the user to diagnose and repair because the principal and most critical parts are usually hidden under the flywheel, upon which they must depend for their energy, timing, and funcitoning. Thus, when the flywheel is removed for access to the components, neither the ignition system nor the engine itself can be run or monitored. The magneto systems are especially prone to failure when cold; but inspection as to the location and type of trouble can be performed only after teardown, which almost invariably changes the condition that was to be investigated. Present systems have to be integrated into the design of the engine; because of this they impose too much influence upon engine configurations. Repeated attempts to design new systems, such as those using piezoelectrics, have thus far failed to compete successfully against the magneto. In Pat. No. 3,349,760, I introduced, among other disclosures, the concept of piston timing of piezoelectric ignition systems. In the application first listed above, I introduced new means for stressing the piezoelectric to generate voltages for engine ignition and other purposes. In the second, I provided further stressing arrangements for limiting and controlling the application of force to the element and coordinated them with further advances in this art of piston timing.

SUMMARY OF THE INVENTION

The simplest form of high-voltage generator for engine ignition requires only the amount of energy that can be easily stored in a single ferroelectric transducer after it has first been polarized to make it piezoelectric. Yet, many difficulties have plagued inventors since ferroelectrics were first hopefully connected to spark plugs. Impacting devices, wedging squeezers, rotary timers, and many other mechanisms were invented to solve each new difficulty as it arose, but the number of problems did not appear to diminish. Getting a vigoruos spark with every engine cycle, accurately timing it, preventing stray sparks from wreaking mischief, and trying to pace spark advance with engine r.p.m. are individual facets of the problem that appear momentarily to be solved from time to time; yet failures to accomplish them have resulted in a continuing failure of the ferroelectrics to qualify in an industry long dominated by the ancient magneto and its ancillaries.

Timing may, ideally, be calibrated as a function of engine phase or even of voltage level with ferroelectrics; but varying load conditions, spark-plug erosion, and both metallic and non-metallic fouling have all combined capriciously to upset design predictions. Inserting a series gap has been tried as a means of stabilizing the timing; but the highly variable range of spark-plug impedances makes it difficult to select an appropriate gap in view of the fact that the series gap, if it is to have control, requires that its own impedance always be much higher than that of the load. This means, of course, that most of the available energy must be spent in the gap and not in the engine cylinder and that it cannot serve for ignition of the mixture.

Particularly at low speeds, when the ferroelectric yields the least net output, and when ignition conditions are least favorable, the aggregate impedance of the spark plug and the series gap may bar the transmission of spark energy. And whenever the energy fails to transit the load, the charge left on the transducer is likely to disturb the electrical phasing of the system sufficiently to prevent spark generation on subsequent squeeze cycles.

What is needed is sound and reliable means for keeping the overall output impedance, which includes the total of all timing and switching means as well as that of the spark plug, as high as possibe right up to the instant when a spark is desired, whereupon, with a minimum of energy consumption, the total impedance must be made to fall to a level as close as possible to that of the fully ionized spark gap in the engine cylinder. The piston-switching means in my prior applications do this; but they require modification of the spark plug and the piston.

The timing means in this application accomplish much the same end with ordinary spark plugs and without activation on the part of the piston. The sudden changes in load impedance are accomplished in phase with cam motion as a consequence of the accumulation of stored energy in the system, the switching of the impedance level being accomplished by mechanical, electrical, and mechanical-electrical triggering means functioning on stored-energy levels, the levels being fixed by design. Timing can be adjusted by simpy rotating the apparatus about the cam or other motion appropriate to non-rotary inputs.

The unitary assemblies disclosed herein may be easily installed and removed without further disassembly of the engine and can be mounted on any appropriate apparatus for testing.

While mechanical energy may be stored in any elastic member under load, it is most conveniently stored for the purpose of this invention in elastically buckling columns of the character of those introduced in the second of the two abovementioned pending applications because of the generous mechanical motions achievable therefrom. However, the energy can be stored in a beam or other elastic machine elements; therefore, the more primitive lever-type mechanisms (a lever being a form of cantilever beam) can also be adapted for this purpose.

Contact switches, for triggering the energy stored in the ferroelectric, may be mounted on these elastic members; but such switches would behave merely as ordinary series gaps and would arc prematurely and unpredictably under the high voltage present before they are closed. However, if a suitable dielectric bath is provided, such arcing, which will discharge the ferroelectric into the spark plug, may be held off until the desired instant and thus instantaneously reduce the series impedance between the ferroelectric and the spark-plug gap virtually to zero. Other switching or triggering means that are disclosed are responsive to the level of stored electrical energy in the ferroelectric itself. These electrical means operate to transform downwardly with minimum energy loss the blocking impedance in an ionizable enclosure in series with the spark-plug gap. Rectifying means are combined in various ways with the impedance-transforming means, primarily but not necessarily exclusively to prevent the kind of phasing disturbances that have characterized the more primitive ferroelectric systems.

The unitary assemblies disclosed herein may be coupled to any appropriate engine shaft or cam having a suitably phased motion. They enable the ignition function to be performed under severe humidity conditions in wet places where magnetos would fail. They may even be used in the harsh environments encountered by the wet-skinned "Skimmer" and "Underboard Engine" applications discussed in my prior Pat. Nos. 3,161,172; 3,162,181; and 3,223,067, because of their immunity to failure even when the engines are submerged.

Moreover, since these systems are self-timed, they do not require either special spark plugs or piston timing of firing pulses, nor are they compelled to rely upon ionized combustion zones for carrying off the release impulses. Pulsing of these integral systems may be more handily retarded for starting, advanced in step with engine speed, and swung completely out of phase for stopping the engines than any ignition devices heretofore known.

BRIEF DESCRIPTION OF THE DRAWINGS

Because the drawings are oriented primarily toward clarity of graphic presentation, the parts are not necessarily drawn to scale.

FIG. 1 is a sectional elevation of one form of the piezoelectric ignition control system employing a buckling column for energy storage and switching; and FIG. 2 is a view from above of the principal portion thereof.

FIG. 3 is a sectional elevation of a variation of FIG. 1, in which the column serves to switch the firing voltage without itself being in the circuit; and FIG. 3A is a structural variation of the column of FIG. 3.

FIG. 8 is a sectional elevation employing rectifier means for leading off the release pulse, a plural-phase dielectric, and a variation upon the hot-line switching devices of FIGS. 1 and 3.

FIG. 9 is a sectional elevation illustrating alternative switching means and FIG. 10 is a partly sectioned end view of the embodiment of FIG. 9.

FIG. 11 is a sectional elevation of a form of the invention having rectifiers paired back to back against a pole of the ferroelectric; and FIGS. 12 and 12A are alternative schematic diagrams thereto pertaining.

FIGS. 13 and 14 are a sectional elevation and a circuit diagram of a form using a rectifier for carrying off the release charge and having a triggered spark gap for delivering the ignition pulse.

FIGS. 15 and 16 are a sectional elevation and a circuit diagram of a form like that of FIGS. 13 and 14, except that a triggered flash tube is used instead of a spark gap.

FIG. 15A resembles FIG. 15 except for the fact that the control or trigger electrode of the tube is physically movable.

FIG. 17 is a form that uses a lever in a dielectric medium in place of the buckling column that electrically resembles FIGS. 1 and 3; and it might alternatively resemble FIGS. 4 and 7 electrically with rerouting of the connections.

FIG. 18 is a form that uses a lever in a dielectric medium but electrically resembles FIG. 8. If the arm touched a spark gap, it would resemble FIGS. 13 and 14 electrically. It could resemble FIGS. 15 and 16 electrically with a further change from spark gap to triggered flash tube or could resemble FIG. 11 electrically if a rectifier is provided and switching is modified.

FIG. 19 is a simplification of FIG. 8, eliminating switching and dielectric fluid at some cost in performance.

FIGS. 20 and 21 are alternative schematic representations of FIG. 19.

FIG. 22 is a further simplification of FIG. 8, now eliminating the rectifier; and FIG. 23 is a schematic representation of FIG. 22, while FIG. 24 shows the pattern of cam excursion most desirable with FIGS. 22 and 23.

FIGS. 25 and 26 are, respectively, a sectional elevation and a schematic of a unitary ferroelectric ignition apparatus embodying a rectifier and a triggered spark gap.

FIGS. 27 and 28 are, respectively, a sectional elevation and a schematic of a unitary ferroelectric ignition apparatus resembling that of the prior figures but employing a flash tube.

DESCRIPTION OF THE EMBODIMENTS

Figure 4:
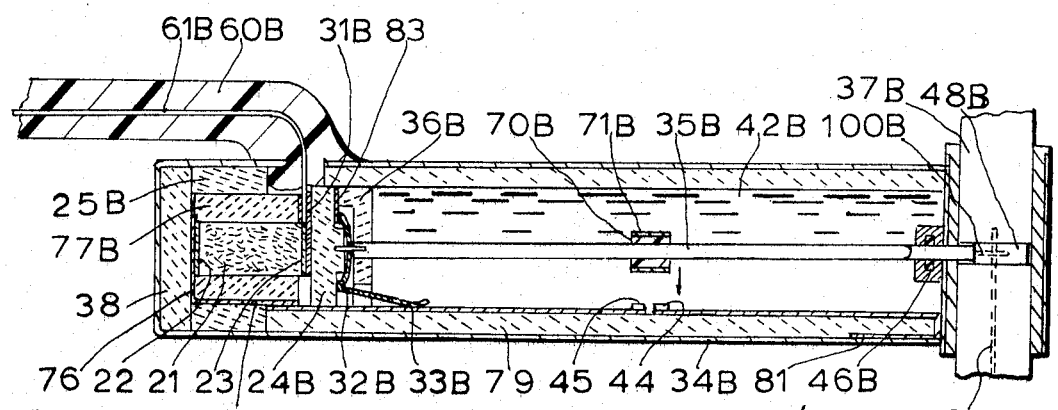
FIG. 4 is a sectional elevation of a form of the invention disclosing a dual-phase dielectric and in which the switching is done on the ground-return side of the system, the release pulse being discharged via a load.

Referring now to FIG. 1, there is seen a unitary ignition system wherein element 21, preferably a cylinder of a high-dynamic-strain type of ferroelectric, such as is represented by the "PZT-4" formulation of polarized lead titanate zirconate, electroded 22, 23 at its opposite ends, is sandwiched between a metallic end block 26 and the base portion 27 of an inverted ceramic cup insulator 28, which has deposited conductors 30, 31 passing via a small hole through the base portion 27 and continuing to face outwardly from the remote surface of base portion 27. Conductor 31 makes contact with a hardened, prestressed metal spring switch 32, having an "oil-can" contour and a finger 33 that normally grounds electrode 23 and conductors 30 and 31 to the inside wall of tube 34, which forms the major part of the housing.

Buckling column 35 not only transmits to the piezoelectric via base portion 27 the compressive force it receives from push rod 47 but also serves as a conductor for the electrical charge that will be delivered by piezoelectric element 21 in response to that force. The source of energy is cam 48 contoured into shaft 37. At the right or camming end of column 35 it fits into a pocket in the insulating ceramic plug 40, which has a very slight venting groove 41 to permit reciprocal motion thereof in the liquid dielectric 42 with which tube 34 s filled. When the clearance is ample or the fluid is compressible no groove is needed. A wide variety of dielectric fluids 42 is available. These include the silicones, liquid or dual-phase hydrocarbons and fluorocarbons, etc. Pushrod 47 reciprocates in an axial opening in shaft adapter 45 and is sealed by O-ring 46. Shaft adapter 45 is retained in tube 34 by U-pin 56. The surfaces of cam 48 are lubricated by tiny oil vents 99, 100 drilled axially and transversely through shaft 37 and communicating with the extraneous engine.

When cam 48 rotates against the end of pushrod 47, column 35 first compresses switch 32, then delivers the compressive load via base portion 27 to ferroelectric element 21, which develops a high voltage between its face electrodes 22 and 23. The polarity of the voltage is the same as that of its original polarizing voltage which was impressed during manufacture. The element will function just as well if it is turned end-for-end, reversing the output polarity. When compressed, switch 32 flattens, lifting finger 33 off the tube wall 34, thus unshorting ferroelectric 21 so that it may develop and hold a high firing voltage under axial compression. Guide plate 36, which does not carry the column load, maintains alignment of column 35 and finger 33 and may be of ceramic or plastic.

For a column having an oblong cross section, as column 35 preferably does, the transverse deflection under axial load will be parallel to the short sides of its cross section and may be consistently predetermined in direction by various means, including the imposition of very slight, perhaps invisible, bend, kink, or other asymmetry anywhere along its length, by angling one or both of its end surfaces, etc. As cam 48 rotation proceeds toward maximum interference and compression and column 35 "bottoms" 55 at its left end, it begins to buckle in the middle as as its load arrives at and exceeds the ordinary columnar load values. The midpoint contact 58 of column 35 moves upwardly under the influence of asymmetry built into the column in the direction of ignition contact 59, which communicates, via insulated 60 wire, 61 conductor, with the middle electrode of spark plug 63. Insulation 60 is formulated of an elastomer that is resistant to heat and to attack by hydrocarbon solvents.

Since the left electrode 22 of element 21 communicates with ground via end block 26, tube 34, and either shaft adapter 45 and shaft 37 or screw 53 or an optional ground strap, the engine casting 65 continuously holds the ground electrode of spark plug 63 at ground potential. Thus, the making of contact between the midpoint 58 of column 35 and contact 59, which is a function of the phasing of cam 48 with the system axis, times the firing of spark plug 63.

In this first embodiment, the dielectric fluid 42 is the hydrocarbon engine fuel, which may enter tube 34 via conduit adapter 50. It departs via conduit adapter 51 on its way to the carburetor. These identical adapters have been sweat-soldered in place over tube 34. Thus any products of decomposition of the dielectric, caused by possible slight arcing at switch 32, finger 33, or contacts 58 and 59 are continuously flushed away via circulation of the fuel supply into the engine. The volume of any such products would be so exceedingly small that it might not be detectable by careful filtration. Danger of fuel explosion is absent once the tube 34 has been filled with fuel to the exclusion of air. If desired, tube 34 may be incorporated into the bottom of the fuel tank or into the carburetor, perhaps as the float tank, together with means for preventing accidental draining or a warning label with necessary instructions.

In FIG. 2, the rotation of cam 48 is seen to be clockwise. Therefore, counterclockwise rotation of tube 34 about cam 48 advances spark timing. The desired setting may be retained by tightening screw 53 at the outward end, with indicator point 54 positioned in the desired relationship to scale 55. Counterclockwise rotation of an appropriately designed cam will produce a similar effect.

Although wire conductor 61 may be conventionally terminated at the end of insulating cable 60 to slip onto the top of spark plug 63, the system is illustrated with a sealing elastomeric grip sleeve 68 for waterproofing the connection. Further protection may be gained by tightening clamp 69 over sleeve 68. By protecting the plug in this manner, and providing for engine breathing in the manners illustrated in the above-mentioned patents for wet engines, protection may be gained against immersion even in vigorously turbulent saline water. Where not immersed, sleeve 68, if used, would need to be made of a high-temperature elastomer.

Sawtooth cam 48 permits rapid release of pressure upon the ferroelectric 21 so that the full value of the weaker relaxation impulse, which has an opposed polarity, normally appears at the spark-plug electrodes while dense combustion and heavy ionization still remain in the engine cylyinder, keeping the zone electrically conductive and able to drain off the secondary pulse while it is being generated. Roller cam followers, though normally advantageous, tend to modify cam kinematics and delay the release pulse, which, if used up in the combustion chamber, will get the system ready for another cycle but will otherwise interfere with subsequent cycles. The release pulse might be carried off via the ferroelectric itself, since it is not a good insulator, or by leakage elsewhere in the system during the relatively slow engine-starting cycles; but, for maximum reliability, both the squeeze and release mechanical cycles are best followed by immediate and virtually complete electrical discharge.

The conductivity of the ferroelectric may be increased further so that it will self-discharge between cycles and this will be done in another embodiment. However, at very low speeds and during manual starting, such a self-discharge property may be detrimental in that it may cause excessive energy to be rubbed from the squeeze pulse, especially at high temperatures, since the conductivity usually increases with temperature. Conversely, at maximum engine speeds and loads, the release pulse may not have enough time to drain completely, reducing the value of the squeeze pulse and possibly causing the engine to miss.

In this embodiment, the column 35-cam 48 relationship is such that, when the ignition pulse is switched into conductor 61, the drop-off portion of the cam contour then releases the compression load from column 35, which relaxes, allowing finger 33 of switch 32 to re-establish contact between conductor 31 and tube 34, and thus short-circuit the release charge. Again, the dielectric fluid enables holding switch clearances at a minimum and keeping the assembly small.

As in most of the cases to follow, cam 48 and its shaft 37, or only the cam, may be designed to be an integral part of the ignition apparatus or alternatively of the engine.

The shape and structure of the column and of the tube, or counterstructure, make it economical to shield the entire ignition system against electromagnetic radiation during switching and discharge, as well as to exclude dust and moisture, the enemies of all ignition systems; and they further make it more convenient than ever to couple the ignition system with spark-advance controls and with shutoff means that operate by delivering the spark out of phase with the engine.

Referring now to FIG. 3, certain approaches alternative to those just seen will be observed. Element 21 is contained within insulating ceramic cylinder 77. The pre-stressed oil-can type of shorting switch 32A bridges temporarily between the fired-on conductive coating 31A, which covers the end of ceramic insulating plate 24, and column 35A. Column 35A is guided at the left by guide 36A and it has a pin 25 for holding switch 32A in place.

At the right, column 35A is sealed by O-ring 46A in shaft adapter 47A, which is secured to tube 34A by U-pin 56A. As the pressure in Column 35A builds up because of relative rotation of cam 48A on shaft 37A against cam follower 49A borne on the end of column 35A, the switch 32A flattens, disconnecting itself from conductor means 31A and thus disconnecting electrode 23 of element 21 from grounded column 35A. Wire conductor 64A, soldered on the underside of ceramic plate 24 to conductor 31A, leads upwardly into chamber 94. Hot-line conductor 61A travels to the center electrode of spark plug 63 (omitted here).

Grounded column 35A has arm 72 spotwelded to it near the left end; and arm 72 in turn carries at its tip 70 insulated contactor 71. When column 35A buckles, contactor 71 bridges between the aforesaid conductors 64A and 61A, delivering the ungrounded firing potential to the spark plug. As in the prior instance, the grounded side is continuous via end plug 26A, tube 34A, etc.

Timing adjuster 73, whose position is responsive to the r.p.m. of the engine, via a governor or other auxiliary device well known to the art, may be moved perpendicular to the plane of the paper in order to advance or retard the timing.

FIG. 3 discloses another departure that is equally applicable to other embodiments herein. This is the use of a two-phase dielectric fluid, 42A, 142. Certain fluorocarbons and hydrocarbons, for example, boil at much lower temperatures than do silicones and other fluids generally used for removing heat from electronic equipment. In these fluids the transition to vapor 142 occurs well below the decomposition temperature and often below the boiling point of water. This fact permits such equipment to benefit from what is known as ebullient cooling, that is, by boiling, there being generally sharp increases in the enthalpy of fluids passing to the vapor phase 142 (i.e. steam vs. water). The fact that the dielectric strength of certain of the relatively inert fluorocarbons remains at a useful level in the vapor phase accounts for the practicability of the ebullient cooling process in electronic equipment.

In these voltage-generation systems, however, we do not seek thermal protection per se. We seek, rather, to control engine timing, so we employ fluids of high dielectric strength to suppress the tendency of high potential gradients to cause premature arcing between approaching switch contacts. Unfortunately, most of the best, safest, and most reliable dielectric fluids contain carbon as a chemical constituent of their molecular structure. As the contacts bearing high relative potential approach very closely, even the strongest of dielectric fluids may tend to break down when the gap becomes sufficiently small. Even though the duration and the amount of current, and thus the total energy, are very small, the intensity of an electric arc is so great that a very tiny portion of the fluid may be decomposed. One of the final end products of decomposition is carbon, which may be partly in a conductive form. Given a sufficient cumulative concentration of such particles in a liquid, sparking will tend to occur earlier and earlier in the successive cycles of contact approach. Research has not yet developed fluids that have been proven to be wholly immune to this type of breakdown.

Although impurities tend to settle out, they may be kept in suspension by such vibration as accompanies the operation of an engine. The passage of an engine fuel through the apparatus, as in FIGS. 1 and 2, is one answer to the problem. Circulation of fluids other than fuels in the same manner but via external recirculating filters is another. With the aid of vibration, porous filter 155 made of a bonded-in-place fine elastomer, such as open-cell polyurethane foam, or even if allowed to float around in the medium, is another. Placing the foam where mechanical motion tends to circulate fluid is a practical expedient. Thus, the very fact that column 35A tends to buckle causes the fluid to acquire motion. Since the fluid possesses inertia, it tends to resist such motion, and while being displaced acquires kinetic energy of motion, thus forcing some circulation relative to filter 155, whether the filter is stationary or is attached to the column.

Another approach is to use one of the dielectric heat-exchanger fluids that has a high vapor-phase concentration at low temperatures of operation. One of the most suitable fluorocarbon grades is FC-78, made by the 3M Company, which has an unusually low boiling point and relatively high vapor pressure. Instead of filling cylinder 34A with dielectric fluid, then, it may carry far less than half its capacity in the liquid phase 42A, the remaining volume above the liquid containing only the vapor phase 142 at variable pressures that depend on the ambient temperature but preferably several p.s.i.—what might be termed a partial vacuum in the absence of air, which is preferably well sealed out.

Since the contacts are above the liquid level, such impurities as may be generated by arcing will drain down in the ever-condensing vapor produced by thermal differences within the chamber and along its walls, instead of remaining supported in suspension. And the presence of two phases assures that the same vibration that might disperse conductive particles in a single-phase dielectric now adopts the entirely new role of liquid circulator and washing means, whose effect may be further enhanced by foam filter 155 or other porous particle-trapping means, either fixed or mobile.

There are, of course, liquids which contain no carbon. Other requirements are that the liquids not ionize under any anticipatable conditions and that they not react chemically with the contacts or with other materials in the chamber. They must not decompose into metallic or other conductive particles. Preferably they should be non-toxic, non-flammable, and incapable of supporting combustion; but ideal properties may not be achievable.

FIG. 3A is illustrative of the fact that a wide range of structural variations of non-linear force-transmission members is possible. The slender reed-switch extension 72 of member 35A has an excursion that is not necessarily in direct proportion to column deflection. If the contacts it may touch are yieldingly emplaced, it may move them. If not, its range of movement is limited by their presence; but the excursion of the middle of the column need not be significantly affected.

Referring now to FIG. 4, electrode 22 of ferroelectric 21 faces conductive coating 76, which has been fired onto insulating ceramic end plug 38. The conductive path leads via conductor 75, fired onto the exterior wall of insulating ceramic cylinder 77B to conductor 78 on the interior wall of elongated insulating cylinder 79, which may be of ceramic or plastic. Conductor 78 is interrupted at midlength of cylinder 79, where contacts 43 and 44 are slightly separated. Opposite them is insulated 70B shorting contact 71B on column 35B, the remainder of interrupted conductor 78 thereafter leading to conductor 81 on the outer wall of cylinder 79 that grounds to cylinder 34B. These conductors are generally glazed silver frits which have been fired onto the ceramics at elevated temperature. Less expensively coated plastic may be used wherever they are not located in a high-force zone.

The ceramic body 24B between column 35B and electrode 23 of the element 21 is quite different from the plain insulating plate 24 seen in the prior figure. Body 24B is made of a lossy barium titanate capacitor-type material so that there is both capacitance and resistive leakage between its opposite conductors 31B and 83. Switch finger 33B short-circuits conductors 83 and 78 to ground via column 35B when the column is not loaded. When cam 48B on shaft 37B applies a load to column 35B, contact between the column and conductors 83 and 78 is interrupted by the flattening of the disc portion of switch 32B and the consequent detachment of its finger 33B from conductor 78.

Since electrode 23 is always in communication with the ungrounded center electrode of extraneous spark plug 63 (not shown), via conductors 31B and 61B in insulation 60B, when column 35B buckles in the predetermined direction of the arrow, with insulated 70B contact 71B shunting to ground the midway interruption of conductor 78, column 35B again times the spark as a function of its phasing with cam 48B.

Figure 5:
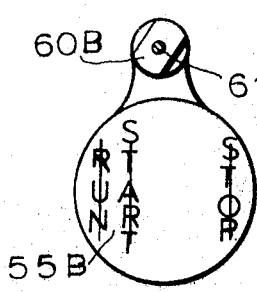
FIG. 5 is a partly sectioned endwise view.

In the end view, FIG. 5, it is seen that scale 55B may be engraved on the movable ignition system rather than on the stationary engine as heretofore.

Figure 6:
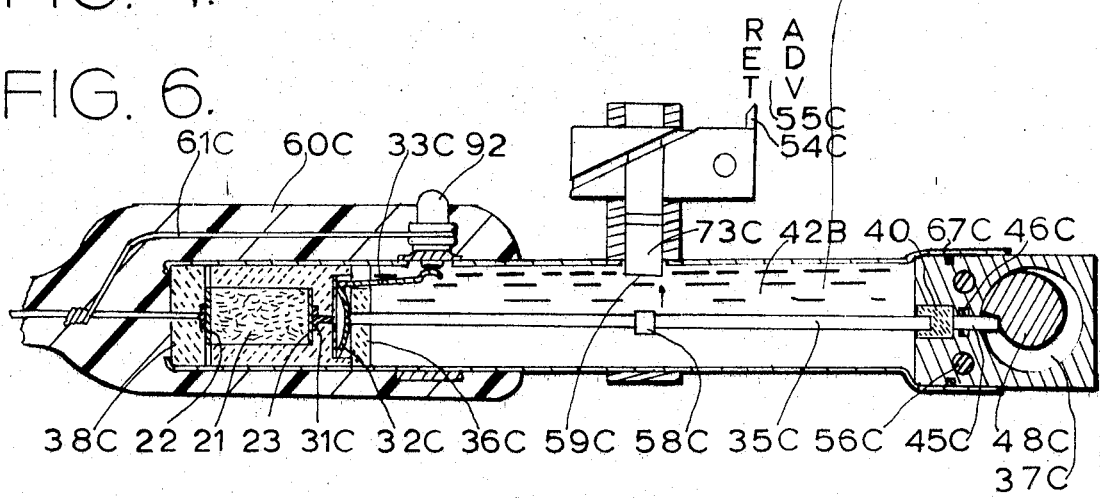
FIG. 6 is a sectional elevation of a variation upon FIG. 4 wherein the release pulse is dissipated via a lamp.

Referring now to FIG. 6, there is seen an ignition system wherein the column 35C is continuously in circuit with the side of ferroelectric 21 which will become grounded when column 35C buckles so much in the direction of the arrow that its contact 58C completes contact with contact 59C of timing adjuster 73C. Column 35C is restrained laterally at its left end by ceramic guide 36C and at its right by ceramic plug 40 in shaft adapter 45C.

Timing contact 59C may be moved radially inward into the tube 34C to advance the spark timing as a function of the displacement to the right of adjuster finger 54C. There is a stop position on the spark-advance indicator scale 55C, wherein the contact 59C is retarded by camming beyond the reach of buckling column 35C, as limited by the radial excursion of cam 48C. Engines may also be stopped by simply retarding or advancing the spark so much that it is badly out of phase with piston position.

The left-end electrode 22 of element 21 is seen to be continuously in series with spark plug 63 (not shown) via conductor 61C. It is also seen that, as long as column 35C is not under load and switch 32C is not compressed by it, the element 21 is shunted via finger 33C into neon lamp 92, through which all release pulses will be almost completely discharged down to a relatively negligible extinction value. When column 35C is loaded, finger 33C parts contact with bulb 92. Thus, most of the release-pulse energy passes into an energy-dissipating device, in this case the bulb 92, and is unavailable for arcing in the dielectric 42B. The maintenance of low arcing potentials within the fluid reduces contamination by carbon or other breakdown products and enhances longevity of fluid 42B.

The lossy capacitor 24B of FIG. 4 and the neon tube of FIG. 6 are each examples of energy dissipating means, simple resistors and inductors also having value, provided that they are not afforded sufficient time in circuit to steal much energy from the squeeze pulse. Outside exposure of the tip of lamp 92, as seen in FIG. 6, may aid diagnosis of possible failures of system components. Except for the fact that the ground circuit is switched by column 35C, the structure of FIG. 6 bears some similarity to that of FIG. 1.

Figure 7:
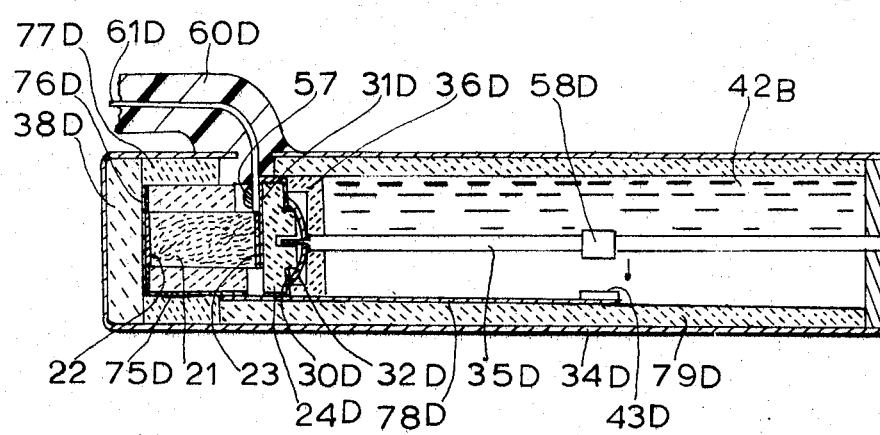
FIG. 7 is a sectional elevation of a variation upon the ground-circuit switching devices seen in FIGS. 4 through 6.

Referring now to FIG. 7, the mechanical termination of this system at the right includes a bolting flange 95 and an O-ring-sealed 46D projecting end 87 of column 35D. The conductive path from the left electrode 22 of ferroelectric 21 moves to the right in the manner of FIG. 4 via electrode means 76D and conductors 75D and 78D along inner wall of insulating cylinder 79D to contact 43D opposite the midpoint contact 58D of grounded column 35D. The right electrode 23 communicates with conductor 31D.

In the absence of columnar force, spring switch 32D short-circuits the release charge of ferroelectric 21 via conductors 75D, 78D, 30D, and 31D. High pressure in column 35D flattens and opens switch 32D. It also isolates column 35D from direct communication with electrodes 22 and 23. As the grounded column becomes more heavily loaded and then begins to buckle in the direction of the arrow, its center contact 58 receives from contact 43D for delivery to ground the potential now existing at the left electrode 22 of element 21, causing the spark plug at the remote terminus (not shown) of conductor 61D to fire. Spark may be advanced or retarded by moving the assembly toward or away respectively from the approach to the end 87 of column 35D of an extraneous camming means.

Referring now to FIG. 8, column 35E is grounded at its right end and isolated electrically at its left end. It is permanently sealed at the right by flexible metallic diaphragm 160, which is welded to both column 35E and the inner end surface of housing 34E. The right end of column 35E is seated within and is guided by roller-type cam follower 49E, which in turn moves in a hole in block 121 under the action of cam 48E. Contact 71E at column midpoint is insulated by layer 70E beneath it. Contact 71E joins conductors 64E and 61E via contacts 43E and 44E when column 35E buckles under load.

There is no release switch in this embodiment. Instead, there is an encapsulated diode rectifier stack 105 having a very high peak reverse voltage (PRV or PIV) characteristic, preferably on the order of about 25 kilovolts.

It was stated above in connection with another embodiment that the polarity orientation of the ferroelectric 21 was uncritical, as it is when the device is switched mechanically. That is still true of the version of FIG. 8. However, the rectifier polarity here should be so oriented with that of the ferroelectric 21 that the forward-current path of the rectifier will accommodate the energy of the release impulse but will block electrical energy transmission during the squeeze portion of the cycle.

The series of diodes that make up the stack rectifier 105 have a uniformly small conductive cross-section area in order that rectifier 105 will have a very low current capacity. It is not that a low forward current capacity is particularly desired, although the energy transmitted is minute; it is that every reasonable precaution must be taken to keep the normal reverse-current conductivity at a minimum because of the relatively slow rate at which the high firing voltage builds up in the ferroelectric 21 and because the firing energy itself is so small. Other things being equal, rectifiers able to conduct large values of forward current are generally less able to hold back some flow of reverse current.

Although it may be desirable that the individual diodes in rectifier stack 105 also be designed to have a low initial transient reverse current, such as may result from the storage of minority carriers in the junction zones of the diodes and the necessity for sweeping them out, this appears to be of less consequence than the normal reverse current because, during the sweepout time, the voltage across ferroelectric 21 will not yet normally have been built up high enough to force much reverse current through the stack.

In FIG. 8 and some of the other subsequent figures, the use of rectifiers and other means either in place of or in addition to switching contacts reduces the amount of energy available for arcing and generating conductive impurities in the dielectric fluid. But FIG. 8 goes further in the effort to endow these systems with longevity. It departs from the single-chamber two-phase system of FIG. 3, replacing it with a two-phase system which is substantially a vapor-phase 142 system in the switching compartment within tube 34E. It carries the liquid phase 42A stored in the rechargeable lower antechamber 122 that is cut into block 121. Communication between compartments is via port 123. Leakproof welded diaphragm 120 assures against exchange of atmospheres which might otherwise be produced via the slight pumping action of O-ring seals. Diaphragm construction is, of course, also applicable to the other embodiments herein.

Referring now to FIGS. 9 and 10, although the column still delivers the force to ferroelectric element 21, it is not called upon to do the switching. Camshaft 37F is a part of this embodiment, being packed 46F against leakage and keyed 111 to be driven externally of an engine, to which it may be secured by suitable clamping means. Column 35F is prevented from moving laterally of the cam in a direction transverse to the paper by a pair of roll pins 112, the lower of which appears in the section drawing.

The square shanked portion 113 of shaft 37F below upper bearing 115 keys the grounded switch contactor 116 to shunt both contact fingers 117, 118, as seen in the drawing, and alternately once each revolution to ground the upper one 117. Grounding both at an appropriate instant while column 35F is unstressed short-circuits the release charge developed in the ferroelectric 21. Grounding only contact finger 117, which leads from the right electrode 23 of the element 21, an appreciable part of a revolution later, as, for example, 180°, when the column 35F shall have become nearly fully bowed, completes the ignition firing circuit, since the left electrode 22 of the element 21 is continuously in circuit, via conductor wire 61F, with the middle electrode of spark plug 63 (not shown).

As seen in the phantom lines at the lower center of FIG. 9, the buckling column might again alternatively have been employed as in FIG. 5 to close the ignition circuit instead of using projection 119 and finger 117 for this purpose.

Referring now to FIGS. 11, 12, and 12A, the latter two are nearly identical schematic representations of FIG. 11. They differ only in that the polarity arrangement of the ferroelectric 21 in FIG. 12A is opposite from that of FIG. 12; so the polarities of rectifiers 105 and 125 are reversed between the schematics.

Rectifier 105, seen in prior FIG. 8, is employed here in an identical manner. The distributed resistance in rectifier 105 and the conductors may again, as in FIG. 8, be augmented by other energy-dissipation means, including such as were shown in FIGS. 4 and 6 (24B and 92 respectively). This resistance is lumped as R–1 on the right of FIGS. 12 and 12A. The same is true of subsequent figures in which release-charge energy may be dissipated in conductors of small cross section or in discrete components included in the system.

Composite column 35G has a plurality of component members, all tending to bow outwardly a more or less equal amount at any given overload. Electrical contact is completed at only one point, however, via contact 58G.

Column 35G is tipped with an O-ring-sealed 46G roller cam follower 49G. Contact 58G triggers the discharge when it establishes a through connection via contact 59G between rectifier 125 and ground, represented by tubular housing 34G. Again in the ground line, as in other figures herein, there will be more distributed resistance, which is lumped here as R–2.

The requirements to be met by rectifier 125 differ markedly from those considered necessary in rectifier 105. The forward voltage on rectifier 125 is the same as the reverse voltage on rectifier 105; but it is only transiently applied to rectifier 125 at the instant when switch 58G, 59G is closed to complete the firing circuit into spark plug 63. Since the release charge appears as forward voltage on rectifier 105 it is conducted therethrough and dissipated as fast as the energy is allowed to flow by the lumped circuit parameters; so it nevers achieves a very high voltage value; and, since it is also the reverse voltage on rectifier 125, the latter does not need to withstand the high reverse voltage peaks imposed upon the former. This differentiation between the functions of the rectifiers is not intended to deny the use of a common rectifier type having characteristics high enough and well enough balanced for use in both applications.

Referring now to FIGS. 13 and 14, rectifier 105 is again employed to divert and dissipate the release charge of element 21, while barring the flow of squeeze energy. It is connected between the junction of right hand electrode 23 and conductor 31H, to the latter of which its lead is soldered at 57, and ground at the right. The distinctive novelty here is the triggered spark gap 135, which has a trigger electrode 138 in addition to gap electrodes 136 and 137, either of which can be oriented toward the element 21. These spark-gap electrodes are hidden in FIG. 13, only the contact 59H, and terminals 140 and 141 leading to the respective electrodes being visible.

Energization of the trigger electrode 138 by the high squeeze voltage of ferro-electric 21 causes an initial flow of current between that electrode and the one of opposite polarity, the ground side in this case. The resultant ionization which is localized causes the firing pulse to make the transit between the principal electrodes 136 and 137. A small-wattage resistor 139 or a sufficient value of distributed resistance in the conductors, including column 35H, is in series with the trigger electrode 138, so as to hold back current flow from the trigger circuit and compel the current to follow a preferential path of extremely low resistance (after ionization) between principal electrodes 136 and 137.

Because spark gaps of the type disclosed are usually made with large distances mutually separating the contacts and terminals 59H, 140 and 141 leading to the electrodes, it is more than usually practicable in this instance for contact 58H on column 35H to perform its switching function in air, particularly if dust can be prevented from settling on a shunting path. However, even in this case, I prefer the performance obtainable with fluid dielectrics.

Referring now to FIGS. 15 and 16, which likewise contain high-voltage rectifier 105 aligned to block squeeze pulses accumulating in ferroelectric 21 and to conduct release pulses, flash tube 127, preferably is of the elongated path type having a high voltage arc-over value, such as is seen in sparsely filled gas tubes. It has a third or trigger electrode 130 in addition to principal electrodes 128 and 129 that are concealed within the tube 127. The trigger electrode 130 need not necessarily be contained within the gas chamber itself. When it is located outside the glass envelope, as here, the current flow via contact 58J and trigger electrode 130 is negligible and there is a minimum of contact arcing. If desired, fluid may be dispensed with. The tube needs a deionization or recovery period after firing sufficiently brief to prevent premature conduction of the next subsequent impulse, even at high engine speeds. Porous filter 155J is squeezed by deflection of column 35J, promoting limited cyclic circulation of fluid 42J therethrough.

FIG. 15A differs from FIG. 15 primarily in that trigger electrode 178 is movable, of semi-cylindrical contour and having appreciable area and capacitance relative to the tubular flash tube 127R, it is mounted on column 35R and so oriented as to be deflected thereon into triggering position against the surface of the tube.

Referring now to FIG. 17, levers have been used for squeezing ferroelectrics heretofore, but without accomplishing the ends of this disclosure. Dielectric fluid 42 is a circulating hydrocarbon fuel, as in FIGS. 1 and 2, sealed in via O-ring 46K, located in an opening in housing 34K that admits adjustable threaded actuator pin 145. Pin 145 moves reciprocally in the direction of the arrow in response to an extraneous camming means (not shown). Lever 144 is displaced cyclically by pin 145. Lever 144 has an insulated 70K contact 71K on its inward face. Electrode 22 is grounded to lever 144 by hard metallic plug 149. Insulated 133 contact 134 is permanently connected (not shown) via extension conductor 148 (interrupted) to right-hand electrode 23 of element 21, which is, therefore, initially short-circuited electrically via plug 149, lever 144, and contact 134.

When pin 145 lifts lever 144 of contact 134, the short circuit is removed from element 21, whose last prior release charge had been drained to ground thereby. When lever 144 has advanced inwardly through the fluid 42 until cam 147 has fully squeezed element 21 via plug 149, insulated 70K contact 71K completes the circuit from grounded element 21 via conductor 64K and contact 43K to contact 44K and conductor 61K, leading to center contact 62 of the spark plug (not shown), to ignite the mixture in the combustion chamber.

Although advance and retard controls can be built in elsewhere, pin 145 itself may be moved either way, via its own thread, to advance or retard the spark. Plug 150, sealed by O-ring 151, has its outer surface threaded for adjustment of squeeze via ceramic disc 38L of the ferroelectric 21 at the right end of FIG. 17. It will be seen that this unitary ignition system is electrically similar to FIGS. 1 and 3. It would be electrically similar to FIGS. 4 and 7 if the interruption closed by the lever were between the ferroelectric 21 and ground, as, for example, if the lever arm 144 were insulated from an ungrounded ferroelectric and if an insulated contact on the advancing lever arm were to ground the element.

Referring now to FIG. 18, the lever-powered system resembles that of FIG. 8 electrically, with the same rectifier 105 similarly situated so as to block squeeze pulses. Rectifier 105 is in series between grounded tube 34L and contact 43L, as revealed by dotted-line interconnections. As in FIG. 17, contact 43L, at the end of squeeze motion by lever 144L, is directed via insulated 70L contact 71L to discharge element 21 into spark plug 63 (not shown) via conductor 61L.

This system can be converted to one electrically analogous to that of FIGS. 13 and 14 if contact 70L is made to touch the trigger electrode of a spark gap. It can be converted in the manner of FIGS. 15 and 16 if contact 70L completes circuit into the trigger electrode of a flash tube having a high voltage arc-over value. Or it could become electrically similar to that of FIG. 11, plus either FIG. 12 or 12A, provided that rectifier 125 is similarly wired in and if contact 70L is made to close the circuit from rectifier 125 to ground as do contacts 58G and 59G in FIG. 11. Generally speaking, most of the electrical circuits shown herein to be feasible with buckling column systems can be derived via levers and other devices for acquiring mechanical advantage. This fact does not negate the advantages characteristic of buckling column systems.

Referring now to FIGS. 19, 20, and 21, it is seen that, whereas FIG. 8 was a constructive elaboration upon preceding forms for performance improvement, a reversal of the elaboration trend may have some merit in certain applications where cost saving is paramount. Certain numerals in these figures now bear M suffixes instead of the letter E that was used to distinguish parts that had been modified for use in FIG. 8. In every case the M suffix indicates that the changes in the details were direct consequences of the simplification made here.

In this form, the high-voltage rectifier 105 remains in the system. However, the fluid dielectric and the switch are dispensed with. This change involves a distinct reversal of relationship among the ferroelectric 21, the rectifier 105 and the cam 48E. The reversal may be especially noted in FIG. 20, wherein the anode-cathode orientation of the rectifier is reversed so that it will be continuously conductive during the compression of element 21, the squeeze pulse thereby being completely drained. It is seen in an alternative form in FIG. 21, wherein the relationship between element 21 and rectifier is the same as in FIG. 20, but their common relationship to ground and to the center electrode 62 of spark plug 63 is now reversed also.

The effect is that the squeeze pulse no longer appears at the spark plug 63; but the release impulse does. Firing now occurs later in the cam cycle, after dropoff, making it necessary to rephase engine and cam. The energy available for firing the spark plug is much less than when the squeeze pulse is utilized. The reduction in energy available at the spark plug may result in a lesser firing reliability, particularly under marginal conditions, unless certain steps toward compensation are taken.

Column 35E may be stiffened to increase the load on the ferroelectric so as to increase both squeeze-pulse and release-pulse energy. Along with the heavier column cam 48E may be given a greater rise and the diameter of the element and its length both may be increased to utilize the greater squeeze force without overstressing the element.

Such changes will impose a still greater workload on rectifier stack 105, which will already bear the increased electrical and thermal burdens of disposing of the stronger squeeze impulse. Such resistors as may be in series with rectifier 105 for handling waste power will likewise carry a heavier load. Thus, the conducting areas of the individual diodes in diode stack 105 must be greater for equivalent life. More energy will be wasted and more heat must be disposed of.

Because the potential developed during compression release is less than that of compression, the peak inverse voltage (PIV) requirement upon rectifier 105 will be lessened only if the gross polarizing potential has not been increased, though this is unlikely, because the element will probably have to be longer and thus require a higher polarization voltage so as to lift the release-pulse amplitude to the voltage level of the squeeze potentials utilized in other embodiments.

The fact that, when shorted or shunted, a ferroelectric has a lesser effective Young's modulus during compression than when open-circuited means that the element, size for size, will offer a less stiff reaction to the column during compression but will itself be mechanically stiffer during release by virtue of the effective open-circuiting of the diode stack. One might then expect it to develop a greater release impulse in a shorter interval than heretofore. This system requires that the element have maximum quality and minimum lossiness.

Because even the best ferroelectrics have some conductivity and, therefore, suffer some power loss via self-shunting, the elastic recovery of column 35M and element 21 must not be impeded. One step might be the elimination of roller cam follower 49E in favor of a flat-ended or sharp-edged bottom surface of the column (as in FIG. 22), so that the stress transition in the column will take place with maximum abruptness. Such a change will increase rubbing wear rates of column and cam and may require harder and more expensive alloys, finish, and heat treatment, together with first-quality, continuous lubrication. Before the advent of the buckling-column principle, which is far less critical dimensionally and less wasteful of energy than were the former high-friction, high-wear-rate, lever and wedge systems, use of the compression-release characteristic of the element would have greatly magnified the problems in way of reliability and longevity. The cam 48E in FIG. 19 retains the sawtooth contour akin to those seen in plan in FIGS. 2 and 6.

Referring now to FIGS. 22, 23, and 24, there is a further simplification marked by further important though small changes in some of the retained parts, which, when modified for this embodiment, now carry the suffix N. There being now no longer a rectifier, element 21 needs a means, illustrated in FIG. 23 as resistance 139N for enabling discharge of the slowly built squeeze voltage while squeeze is increasing. Resistance 139N may be a discrete resistor or its value may be distributed. It is shunted between electrodes 22 and 23 and has a value just sufficient to keep element 21N discharging at a rate equal to that of input of squeeze energy. Resistance 139N might preferably be a shunt resistance value built into a lossy transducer 21N, were it not for the fact that lossy elements are much more susceptible to self-overheating and self-destruction at high engine r.p.m. There is greater likelihood at high r.p.m. that a partial charge will remain on element 21N when the cam dropoff point is encountered, causing pre-cancellation of all or part of the release charge.

Full discharge of the squeeze impulse becomes easier to assure, especially when the engine has a wide speed range, if the cam, instead of having the simple sawtooth contour seen in FIGS. 2 and 6, has the pattern defined in FIG. 24, in which, after compression terminates its rise at C, the extended flat between C and A gives the element some time for discharge of its squeeze charge, prior to the instant of cam fall-off, designated as A–A'. A speedy release, maximized by the elimination of former roller cam follower 49E, now enables fastest possible generation of a maximum-release impulse, with the least possible time for resistance 139N to rob some of the release energy being generated.

Though the cam may have a vertical dropoff as shown, the elastic recovery of column 35N and element 21N still take a little time; but the very low inertia of the slender column and its tendency to jump when released enables the stiff element 21N to recover its uncompressed length the more quickly. Thus, if cheapness is the governing consideration, as in toys and toy engines, the system of FIGS. 22 and 23 will be the lightest in weight and cost the least, while still being functionable.

As in most other cases herein, cam 48E may, at choice, be incorporated either as part of the voltage generating apparatus or as a part of the extraneous engine.

Referring now to FIGS. 25 and 26, rectifier 105 is again engaged in blocking the transmission therethrough of electrical energy generated by piezoelectric 21 during the squeeze pulse but it will shunt all release half-cycle impulses through itself and through any other resistive means that may be in series with it.

The principal electrodes 140P and 141P of high-voltage spark-gap device 135P form terminals of an ionizable gap in series between the ferroelectric 21 and spark plug 63. Electrode 140P is directly connected to the center electrode 62 of spark plug 63, while the other principal electrode 141P has the potential associated with electrode 23 of the ferroelectric. With current-limiting resistor 139P interposed between electrode 23 of the ferroelectric and the trigger electrode 59P of the spark-gap device 135P, the potential at electrode 59P differs from the voltage magnitudes associated with the other two electrodes thereof under most conditions of energy flow, even the slightest. Thus, there is no need for a mechanical triggering switch associated with column 35P, since at the calibrated column load value, trigger electrode 59P can promote local ionization with respect to one or both of the principal electrodes 140P and 141P, following which the breakdown spreads through the gap between the principal electrodes and becomes general, without the waste of energy that would occur in a simple series gap.

Referring now to FIGS. 27 and 28, there is shown a unitary ignition system closely resembling the triggered flash device of FIGS. 15 and 16. The difference lies in the omission of trigger electrode switch contacts and the substitution therefor of a permanent connection to a trigger electrode from the ground side of the circuit, though, alternatively, the trigger electrode may lead from the hot side. A current-limiting resistor 139R is shown inserted between ground and the trigger electrode. Ordinarily a resistor will not be required unless the trigger electrode 130R actually projects through the glass envelope. More than likely in such a case, other detail design parameters would need to be changed in order to keep the tube from flashing over prematurely into conduction at a lower voltage. In the case portrayed, the resistor has slight effect.

As indicated in the summary, it is desirable that there be a way of preventing the trigger electrode, when paralleled with one of the principal electrodes, from carrying current to the virtual exclusion of the other. In the case of the flashlamp, locating the trigger electrode outside the envelope constitutes a highly effective barrier to current flow. In a case of this type the trigger electrode may have an effect that is largely capacitive and effective primarily because of the precipitously changing waveform in the output of the ferroelectric. However, if the trigger electrode has good conductive access to the ionized plasma, the use of auxiliary means for restricting electron flow, such as a resistance, either discrete or distributed, becomes necessary if the trigger electrode is not to usurp the function of one of the other electrodes.

Figures 29, 30:
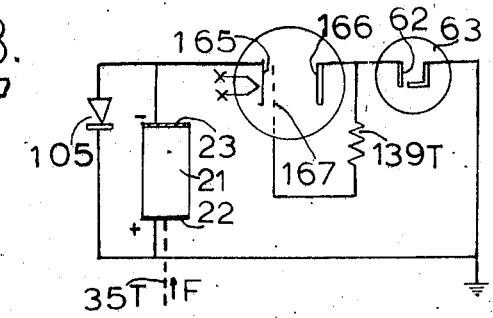
FIG. 29 continues the trend of the figures immediately preceding with a schematic diagram of an ignition apparatus employing a high-voltage thyratron.
FIG. 30 carries the design trend further with a schematic diagram of a similar apparatus employing a high-vacuum or "hard" tube.

Referring now to FIG. 29, the circuit differs from that of FIGS. 27 and 28 only in that the cathode 160 and anode 161, respectively, of a high-voltage thyratron now take the place of the principal electrodes of the flash tube, while the grid 162, with resistor 139S in series therewith, takes the place of the trigger electrode.

Referring now to FIG. 30, the tube is a high-vacuum type, built to withstand breakdown with high voltage between cathode 165 and another 166. Grid 167 has been paralleled with plate 166, but with resistor 139T intervening to prevent current from overloading and damaging the grid, as it would do in view of the relatively short distance and low impedance between cathode 165 and grid 167, as compared with the greater distance and impedance of the low-pressure path with the tube separating the anod or plate from the cathode.

When this "hard" tube begins to conduct, it ordinarily would deliver current primarily as functions of the geometry of the electrodes and the changing potentials on them. It need not shut off prematurely, however, because the first rush of cathode-anode current flow through the tube, under the triggering stimulus of the grid, lowers the tube impedance so drastically that the major portion of the potential gradient now appears temporarily across the spark-plug gap, causing the spark plug to fire and again steepening the gradient within the tube so as to drain the ferroelectric charge down to the combined extinction level at which it can no longer muster a sufficiently exciting potential to hold the two arcs in firing series. Cutoff occurs in the tube because of the negligible level of potential that the transducer can now hold across it, even though the fuel mixture probably has ignited and maintains ionization in the combustion chambers.

Figure 31:
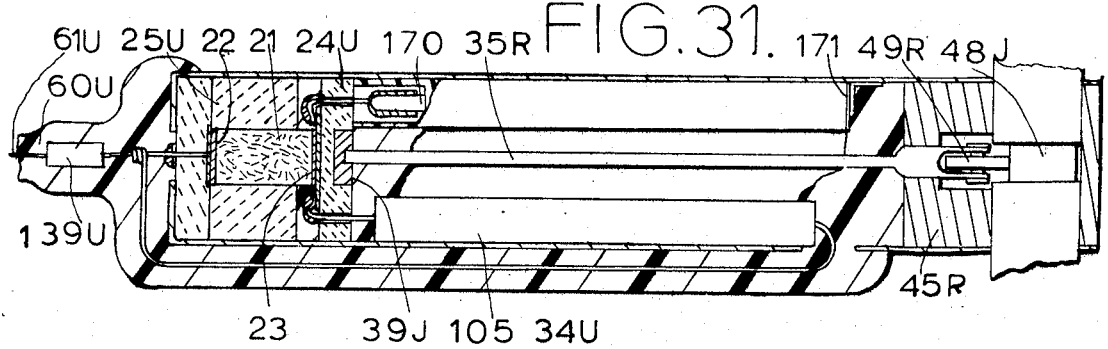
FIGS. 31 and 32 are, respectively, a sectional view and a schematic pursuing the design trend of the six preceding figures except that a special kind of high-voltage diode is used.
Figure 32:
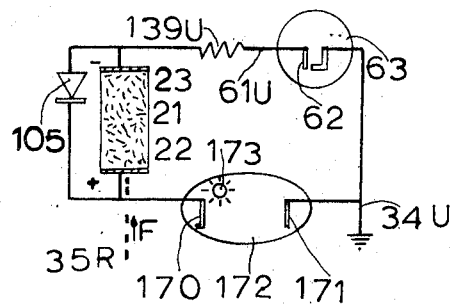

Referring now to FIGS. 31 and 32, several forms of 2-element tube 172 are compatible with the desired triggering function. The one shown is typical of one kind of high-voltage diode normally used as a relatively precise regulator. It becomes conductive when the potential between cathode 170 and anode 171 rises above the threshold differential for which the tube is designed. These tubes are normally polarized in that the cathode is made of or with an electron emitter and a low level of ionizing activity is maintained even in the absence of light by a small amount of strategically located radioactive material 173. It has a fairly sharp and generally constant level of potential difference at which the tube becomes conductive.

Figure 33:
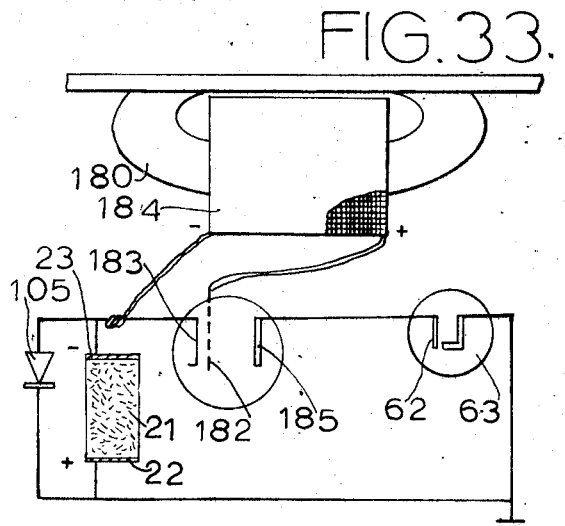
FIG. 33 combines a detail of a magnetically timed variation of the ferroelectric ignition apparatus with a schematic of the complementary firing circuit.

Referring now to FIG. 33, the gap between the pole faces of permanent magnet 180 is closed by the midportion of steel buckling column 35V. Finely wound copper coil 181 embraces the closed magnetic path. When column 35V buckles upwardly in the direction of the arrow, the path is broken and the sharp change in magnetic flux causes the coil to generate a half-cycle voltage surge which triggers the passage of the high-voltage impulse supplied by ferroelectric 21.

The circuit resembles those of FIGS. 28–30, except that grid 182 gets its positive triggering impulse via the coil instead of the ferroelectric. The negative side of the coils, like the negatively polarized side of ferroelectric 21, is connected to cathode 183.

When column 35V again relaxes between cycles, it will again close and bridge the poles of magnet 180, causing a second impulse in the coil, this time of opposite polarity. It will decay before arrival of the next triggering impulse. Thus, it is seen that the triggering signal may be derived via an energy-transfer medium other than voltage or mechanical force and that an appreciable, if very small, amount of such signal power can effect the transmission of stored energy.

Figure 34:
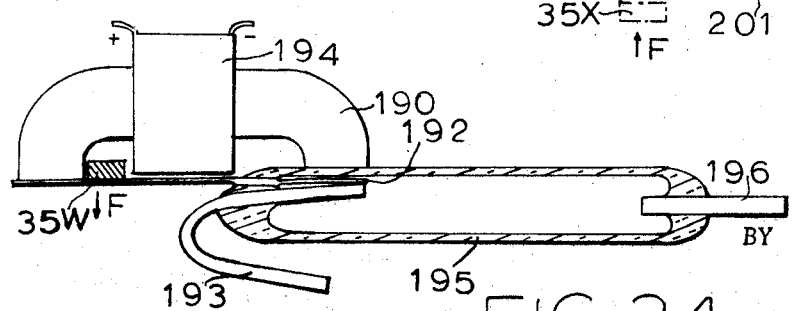
FIG. 34 illustrates a further magnetically timed variation of an ignition apparatus.

Referring now to FIG. 34, this device also has a magnet 190 and a coil 194, which generates signal in a manner resembling the prior case; but the resemblance ends there.

The flux closure path for magnet 190 includes a thin leaf or blade type of grid 192, made of soft iron or other highly permeable material and weakly sprung mechanically to barely touch cathode 193 at the end within tube 195. Although thickened and narrowed where it passes through the wall of compatible tube 195, the grid resumes its blade-type shape so as to fit against the flat pole face at the left end of magnet 190. Cathode 193 and anode 196 are part of a ferroelectric circuit which may resemble that of FIG. 33.

When the left end of grid blade 192 is in contact with the corresponding pole face of magnet 190, the right end of the grid is drawn magnetically upward toward the right pole face and slightly away from contact with catho right pole face and slightly away from contact with cathode 193. But, when the middle of column 35W, seen here in transverse cross section, buckles downwardly in the direction of the arrow, it separates the left end of the grid 192 from the corresponding pole face of magnet 190, thus drastically reducing the flux in the blade and causing it to be mechanically sprung back toward cathode 193. The change in flux is accompanied by a voltage impulse in coil 194, the positive side of which has been connected to the grid and the negative side to the cathode 193. Electrical connections are omitted for clarity in FIG. 34.

As grid 192 springs back to touch cathode 193 within the tube 195, the coil impulse is discharged, the slight resultant local ionization at the grid contact point triggering the discharge of the intense field imposed by the ferroelectric element (not shown) between cathode 193 and anode 196.

Tube 195 may be generally similar in nature to that of FIG. 32, except that the presence of grid 192 eliminates the need for very exacting and high-cost construction of the electrodes and precise location thereof, control over the placement of radioactive agents, gas content, etc.

Figure 35:
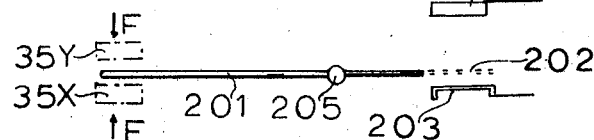
FIG. 35 is a schematic illustration of a form of grid control for a ferroelectric ignition apparatus.

Referring now to FIG. 35, it will be remembered that, in FIGS. 15A and 34, the discharge of energy has been triggered by physical movement of a control grid. Grids have been mechanically manipulated heretofore via levers passing through flexible seals in the walls of vacuum tubes. Thus, a mechanical member, such as a column, shown in phantom lines in optional positions 35X and 35Y, with directions of movement as indicated by respectively nearby arrows, may, for example, be placed against the remote end of such a lever, pivoted at a point in the tube wall, represented by 205, to move grid in either direction as may be desired between cathode 203 and anode 206. The grid 202 might be electrically connected to a point electropositive to the cathode, as in FIGS. 29 and 30, so as to trigger a discharge between the principal electrodes; or a grid resting on the cathode itself and electrically joined to it via a remote current-limiting resistor might be physically lifted therefrom toward the anode to fire the tube and release the spark energy from the ferroelectric.

It is new to provide efficient ferroelectric engine-ignition assemblies that are self timed as a function of the level of energy stored therein and do not waste that energy by routing it via paths of high mechanical friction or high electrical impedance. It is new to use the stress members as part of a switching circuit in non-unitary and sealed ignition assemblies. It is new to perform switch timing of high-voltage piezoelectric ignition systems under a blanket of dielectric fluid that permits the switching excursions to have small amplitude and lets them be carried out at low speeds and with small components in a well lubricated bath.

It is new for ignition systems to require no distributors, multiple assemblies, etc., and not to depend upon other engine components to perform ignition functions; and it is new for them to be so compact and so independent of engine-design influences while permitting engine design also to be largely independent of ignition system detail requirements. Triggering consumes an extremely small amount of energy whether the triggering is by mechanical movement of contacts or by high-impedance triggering of controlled gaps to ionization via auxiliary aids so that they will behave as relatively low-impedance systems for passage of spark energy.

Obviously now, certain features of one embodiment may be combined variously with others and with certain segments of the old art; and they will stimulate imitations in configurations differing in unessential detail from representative showings herein, without departing from these teachings. My invention is not to be limited to specific forms disclosed. All of the equivalent approaches to the constructions, objects, and functions inferrable by one skilled in the applicable arts are intended to be covered by the claims.

Therefore, I claim:

1. A high-voltage, impulse-generation system comprising:
   a piezoelectric transducer polarized to generate high-voltage impulses between opposite electrical poles thereof when subjected to changes within a predetermined range of compressive force applied during appropriate interval between a pair of opposite surfaces thereof;
   apparatus mechanically responsive to an external energy source for cyclically applying squeeze force upon said transducer;
   system-output electrical conductors for delivering such impulses from said transducer to an extraneous high-impedance load;
   an electron barrier interposed in one of said conductors for blocking premature release therethrough of electrical energy of preselected polarity while it is accumulating in said transducer;
   electron-control means responsive to accumulation in said transducer of an appropriate level of energy of said preselected polarity;
   said electron-control means being adapted to time and effect the release through said barrier of an impulse of energy so accumulated; and
   a conductor for separately routing and releasing electrical energy of opposite polarity from said transducer.

2. A system as in claim 1,
   said electron barrier including a pair of opposed electrical terminals separated by an energy gap.

3. A system as in claim 2,
   said electron-control means having a polarity-discriminating characteristic.

4. A system as in claim 3,
   said terminals being electrodes contained within said electron-control means;
   said control means also including at least one control electrode.

5. A system as in claim 1;
   one of said first-mentioned conductors including a rectifier having its polarity aligned for preselection of the polarity of impulses to be delivered therethrough.

6. A system as in claim 1,
   said last-mentioned conductor including a rectifier having its polarity aligned for passage therethrough of electrical energy of said opposite polarity.

7. A system as in claim 1,
   said last-mentioned conductor having a value of electrical series resistance therealong significantly higher than the value of resistance incidental to a metallic conductor mechanically adequate for spanning the distance interval between its ends.

8. A system as in claim 1,
   said electron-control means including a radioactivity source and a cathode having an activated electron-emission surface.

9. A system as in claim 2,
   said terminals being electrodes contained within said electron-control means;

said control means including at least one control electrode;

said control electrode being electrically separated from at least one of the first-mentioned electrodes by a current-limiting ancillary;

said control electrode being positioned at a selected point with respect to said gap for establishing an auxiliary field linking said control electrode to an electrode having different electrical potential;

said auxiliary field being proportioned to break down when the potential thereacross has acquired a desired magnitude;

the breakdown of said auxiliary field being accompanied by a reduction of impedance therein and in a portion of said gap;

said field and said gap being permissibly at least in part coincident;

said gap being subject to breakdown when stimulated by breakdown in said auxiliary field;

whereby said impulse is delivered via said first-mentioned conductors.

10. A system as in claim 2, said terminals being respectively a cathode and an anode contained with said gap in said device;

said cathode having been processed to enhance susceptibility to electron emission therefrom;

said terminals having been oriented with respect to the polarity of said transducer to block passage therethrough of an impulse generated when said force is cylically relieved and to block passage therethrough of an impulse generated when said force is rising until said last-mentioned impulse has risen to a predetermined level.

11. A voltage generation and ignition system for combustion engines comprising:

a piezoelectric transducer polarized to generate high-voltage impulses between opposite electrical poles thereof when subjected to changes within a predetermined range of compressive force applied during an appropriate interval between a pair of opposite surfaces thereof;

apparatus mechanically responsive to an external energy source for cyclically transmitting compressive force to said transducer;

means responsive to the magnitude of energy stored in in at least one of said transducer and said apparatus for timing the release from said transducer of accumulated electrical impulses of a preselected polarity;

said means including an output conductor in series with said transducer and a separate conduction path for impulses of opposite polarity;

said output conductor including a pair of opposed electrical terminals separated by a gap;

said terminals and gap being part of a triode array responsive to the magnitude of electrical potential existing across said gap.

12. A system as in claim 11, said terminals constituting transmitting electrodes;

said array including also a control electrode;

said control electrode being linked electrically to said transducer and receiving a potential therefrom.

13. A system as in claim 11, said array being adapted to conductively couple said terminals as the voltage of the selected impulse rises to a predetermined level and to uncouple said terminals as such impulse recedes to a lower potential.

14. A system as in claim 11, said array including a control electrode;

at least part of said control electrode being movable with respect to the position of another electrode.

15. A system as in claim 11, said array including a control electrode;

said means including a device for transmitting to said control electrode an initiation signal independent of the quantity of energy available in said impulse.

16. A system as in claim 11, said signal having a magnetic transmission characteristic.

17. A system as in claim 11, said triode array having a heated cathode.

18. A system as in claim 11, said triode array comprising a control electrode and two transmitting electrodes separated by a gap;

one of said transmitting electrodes having been processed to promote electron flow therefrom.

19. A system as in claim 11, said terminals constituting transmitting electrodes;

said apparatus including at least one force-transmission member;

part of the energy received from said source being recoverably stored in elastic deformation of said member;

the alignment of said member being such that the said deformation conveys a triggering stimulus to one of said electrodes.

20. An ignition system for combustion engines, comprising:

a ferro electric transducer polarized to generate high-voltage impulses between opposite electrical poles thereof when subjected to changes within a predetermined range of compressive force applied during an appropriate interval between a pair of opposite surfaces thereof;

apparatus mechanically responsive to an external-energy input source for cyclically squeezing said transducer; and impedance-control means responsive to at least one of the level and rise rate of impulses of a predetermined polarity for releasing impulses of said polarity via an output conductor;

said means including a polar, field-activated, impedance-control device.

21. An ignition system as in claim 20, the activation field thereof being electrical.

22. An ignition system as in claim 20, the activation field thereof being magnetically applied.

23. An ignition system as in claim 20, said device having an electron barrier conductively responsive to a superimposed field.

24. An ignition system as in claim 20, said device including a gap separating a pair of transmitting electrodes;

said field being under the control influence of a third electrode.

25. An ignition system as in claim 20, the response characteristic of said barrier being polarity dependent.

26. A system for generating and timing the discharge of high-voltage impulses into an extraneous high-impedance load (i.e., a spark plug) comprising:

a ferroelectric body polarized to generate said impulses between opposite electrical poles thereof when subjected to sufficiently rapid and severe changes of compressive force applied between opposite surfaces thereof;

apparatus mechanically responsive to an external energy-input source for cyclically squeezing said ferroelectric body;

a pair of mutually insulated conductors, each communicating with a respective one of said poles;

an impulse regulating means contained in one of said conductors;

said means including a barrier zone separating a pair of transmitting electrodes and a gating electrode proximate to said zone;

the voltage gradient across said zone being approximately a function of the voltage existing between said poles less the impedance drop allowed for the load;

said gradient being normally insufficient for initiating spontaneous conduction of said impulses between said transmitting electrodes;

said gating electrode being separated in potential from at least a selected one of said transmitting electrodes via a current-limited conduction path;

the conduction threshold between said gating electrode and said selected transmitting electrode being matched to the proximate gradient existing therebetween when a generated impulse reaches a desired amplitude;

whereby the stimulating ionization proximate to said zone resulting from such current-limited conduction reduces the required conduction threshold between said transmitting electrodes to the voltage thereat then available from said impulse.

27. A system as in claim 26, the selected electrode having a cathodic relationship to the other transmitting electrode.

28. A system as in claim 26,
the selected electrode being anodic to the other transmitting electrode.

29. A system as in claim 26,
said system including one-way rectifier means conductively aligned with said body for diverting alternating (impulses of non-selected polarity) from delivery via said conductors into the load.

30. A system for cyclically generating high-voltage impulses and timing the delivery of impulses of selected polarity to an external load, said system comprising:

a ferroelectric transducer polarized to generate said impulses between opposite electrical poles thereof when subjected to change within a predetermined range of compressive force applied during an appropriate interval between a pair of opposite surfaces thereof;

apparatus mechanically responsive to an external energy source for cyclically transmitting squeeze force to said transducer; and conductor means leading from said poles for completing a discharging circuit via said load;

said means including a rectifier aligned for separating the alternate positive and negative half-cycle impulses.

31. A system as in claim 30,
one of said conductor means including a voltage-dependent series component normally having a high impedance thereacross;

said component including an ancillary element for detecting buildup of transducer voltage to a predetermined level and responding thereto by switching said impedance to a low value.

32. A system as in claim 30,
wherein said rectifier is in series with said load.

33. A system as in claim 30,
wherein said rectifier is in parallel with said load.

References Cited

UNITED STATES PATENTS

| | | |
|---|---|---|
| 2,871,280 | 1/1959 | Harkness. |
| 2,954,506 | 9/1960 | Harkness. |
| 3,009,975 | 11/1961 | Hufferd et al. |
| 3,208,443 | 12/1965 | Hurwitz. |
| 3,218,506 | 11/1965 | Williams et al. |
| 3,229,153 | 1/1966 | Freeman. |
| 3,229,154 | 1/1966 | Crownover. |
| 3,355,623 | 11/1967 | Konopa. |
| 3,389,275 | 6/1968 | Brothers _____ 310—8.3 |
| 3,437,876 | 5/1969 | Dotto _____ 123—148 X |
| 3,456,134 | 7/1969 | Ko _____ 310—8.1 X |

FOREIGN PATENTS

| | | |
|---|---|---|
| 712,803 | 7/1954 | Great Britain. |

MILTON O. HIRSHFIELD, Primary Examiner

M. O. BUDD, Assistant Examiner

U.S. Cl. X.R.

123—148; 310—8.3, 8.7; 315—209; 317—79